(No Model.)

W. F. STEVENS.
SCREW CLEANING DEVICE.

No. 491,144.   Patented Feb. 7, 1893.

WITNESSES
Samuel E. Thomas
Emma Lawson.

INVENTOR
Wilbur F. Stevens
By Stewart O. Van De Mark
His Attorney

THE NORRIS PETERS CO., PHOTO-LITHO., WASHINGTON, D. C.

United States Patent Office.

WILBUR F. STEVENS, OF DETROIT, MICHIGAN.

SCREW-CLEANING DEVICE.

SPECIFICATION forming part of Letters Patent No. 491,144, dated February 7, 1893.

Application filed January 19, 1892. Serial No. 418,596. (No model.)

*To all whom it may concern:*

Be it known that I, WILBUR F. STEVENS, a citizen of the United States, residing at Detroit, county of Wayne, State of Michigan, have invented a certain new and useful Improvement in Screw-Cleaning Devices; and I declare the following to be a full, clear, and exact description of the invention, such as will enable others skilled in the art to which it pertains to make and use the same, reference being had to the accompanying drawings, which form a part of this specification.

My invention relates to a device for cleaning the threads of bolts, and is especially adapted for use in wood working machinery in which bolts are liable to become filled with dust and gum. Its object is to provide means adjacent to the nut or interior thread for entering the thread and scraping out any matter that has accumulated there.

Figure 1:
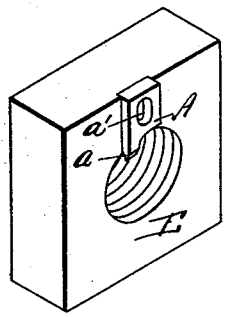
Figure 2:
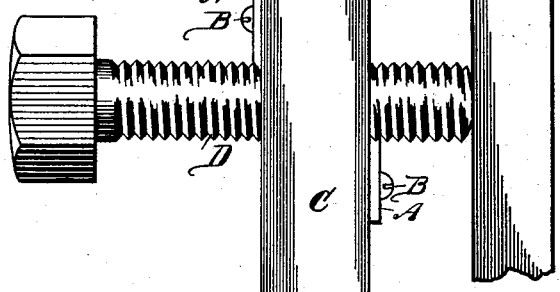
Figure 3:
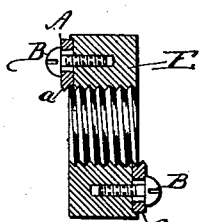

In the drawings, Figure 1 is a nut having my cleaning device attached. Fig. 2 is a view showing a bolt engaged with a frame, and having the cleaning device attached to both sides of the frame. Fig. 3 is a sectional view of a nut showing the device attached to both faces.

In the drawings, A, is the cleaning device provided with a point a, adapted to fit in between the threads of the bolt, and which is formed to fit the thread. There may be more than one point provided to embrace one or more threads if desired. As the bolt is revolved in the nut or other part containing the interior thread, the point a, traverses the groove between the threads, and scrapes therefrom all accumulations.

The body of the scraper A, is provided with a slot a' through which to screw it to the frame or to the nut by means of the screw B. This slot allows the scraper to be adjusted to compensate for wear.

The device may be used with a bolt having a square or an angular thread by forming the scraping point a, to fit the thread.

I would have it understood that the device may be used in machinery of all kinds, but I find it of especial value in wood working machinery. It may also be used to advantage in the working parts of machinery where screw shafts are used, for moving parts of machines in their operation.

I have no knowledge, that a scraper or cleaner of any kind has ever been used to clean the thread of a screw, to adapt it to move freely in its inner thread, and I would have it understood that the cleaning point shown by me, might be dispensed with and a wiper or brush employed to accomplish the same purpose without departing from my invention, which I claim broadly, to be, the employment of a cleaning device adjacent to the interior thread as I specifically point out in the claims.

What I claim is:

1. A screw cleaning device consisting of a cleaning point supported by the nut or interiorly threaded portion, and running in the thread of the screw in advance of the interiorly threaded portion, substantially as described.

2. The combination of a nut or interiorly threaded portion, and a cleaning point independent of the interior thread, said point adapted to clean the thread of the screw, to facilitate the passage of the said interior thread, substantially as described.

3. A screw cleaning device consisting of an adjustable cleaning point supported by the nut or interiorly threaded portion, and running in the thread of the screw in advance of the interior thread, substantially as described.

In testimony whereof I sign this specification in the presence of two witnesses.

WILBUR F. STEVENS.

Witnesses:
HOMER MCGRAW,
GRANT. W. STEVENS.